United States Patent [19]
Ferrato

[11] Patent Number: 4,516,836
[45] Date of Patent: May 14, 1985

[54] CONDUCTOR FOR USE IN ELECTRO-OPTICAL DISPLAYS

[75] Inventor: Joseph P. Ferrato, Stow, Ohio

[73] Assignee: Crystaloid Electronics Company, Hudson, Ohio

[21] Appl. No.: 419,880

[22] Filed: Sep. 20, 1982

[51] Int. Cl.³ ............................................. G02F 1/13
[52] U.S. Cl. .................................................. 350/336
[58] Field of Search ......................................... 350/336

[56] References Cited

U.S. PATENT DOCUMENTS

| | | | |
|---|---|---|---|
| 3,881,809 | 5/1975 | Fergason et al. | 350/343 |
| 3,994,568 | 11/1976 | King et al. | 350/343 |
| 4,090,763 | 5/1978 | Congdon et al. | 339/103 M |
| 4,097,429 | 6/1978 | Elghani et al. | 524/37 X |
| 4,189,549 | 2/1980 | Matsunaga et al. | 525/439 |
| 4,324,836 | 4/1982 | Patton | 524/205 X |
| 4,360,635 | 11/1982 | Alberts et al. | 525/54.23 X |
| 4,362,903 | 12/1982 | Eichelberger et al. | 350/336 X |

Primary Examiner—John K. Corbin
Assistant Examiner—Richard Gallivan
Attorney, Agent, or Firm—Oldham, Oldham & Weber Co.

[57] ABSTRACT

Disclosed is an electrical conductor for conveying electricity between electrically conductive coatings and disposed respectively on plates and of the display that are spaced-apart from each other by means of a hermetic seal enclosing a cavity between the plates for containment of the electro-optical material. The conductor is made from a thermoplastic phenoxy resin or one or more epoxy resin and mixtures thereof and an amount of conductive particles sufficient to provide the amount of conductivity desired in addition to containing an amount of an organic glycol sufficient to insure that electrical continuity is maintained between the plates when the display is subjected to temperature cycling. The material is also useful for conducting electricity at other locations on the display.

17 Claims, 2 Drawing Figures

U.S. Patent May 14, 1985 4,516,836
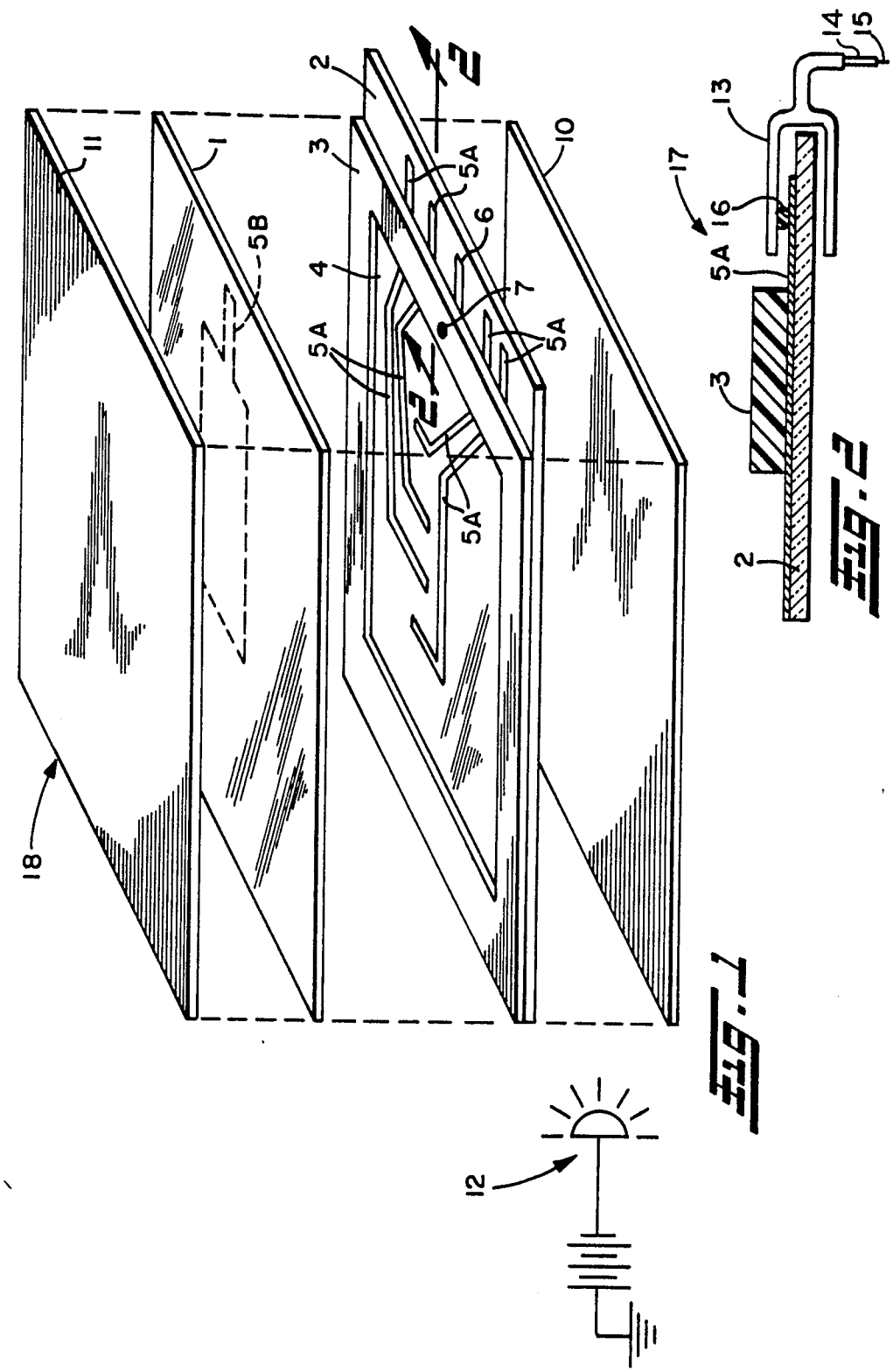

CONDUCTOR FOR USE IN ELECTRO-OPTICAL DISPLAYS

INTRODUCTION

This invention relates generally to electro-optical displays that utilize an electrical current to change orientation of an electro-optical material contained between a pair of parallel plates of the display to provide an image to a viewer and more particularly to an improvement to such displays that utilize an electrically conductive member for transferring electrical current from one plate to the other.

BACKGROUND OF THE INVENTION

Electro-optical displays are well known in the art. Such displays typically feature an electro-optical material enclosed by a hermetic seal within a cavity between two plates of the display of which either one or both plates are made from a transparent material such as glass or quartz. The electro-optical material is generally of the class of materials whose ability to block or transmit light is dependent upon the direction in which light impinges upon its molecular structure with its ability to transmit or block light dependent upon whether it is an electrically energized or an electrically un-energized state whereby it is able to re-orient the direction of its molecular structure with respect to the direction of the incident light. The means by which the electro-optical material is electrically energized is commonly provided by coating the inside surface of the plates adjacent the electro-optical material with a transparent electrically conductive material such as tin oxide or indium oxide. The images transmitted to a viewer of the display are provided by forming the conductive coating into one or more discrete configurations on at least one of the plates so that only the electro-optical material between the configuration and the coating on the opposite plate is electrically energized when electrical power is connected to the particular configuration.

Electro-optical materials suitable for use in electro-optical displays are well known to those ordinarily skilled in the art and have been the object of considerable study and development for many years. Generally, they comprise a unique class of organic materials having a crystalline structure which is able to be rotated or otherwise re-oriented by an electric field and, as a result of such re-orientation, effect the amount of light that is able to be transmitted through the material. Electro-optical materials in common use today are generally known as "liquid crystalline" materials. Liquid crystalline materials are classified according to their liquid crystal packing structure into smectic, chlosteric and nematic type materials. Generally, smectic type liquid crystals feature a parallel layered dispersion of the organic crystalline structure in an amorphous organic fluid medium whereas the chlosteric type features an organic crystalline structure that is in the form of coils and the nematic type features a uniformly disposed organic crystalline structure within an amorphous organic medium.

Most commonly used today for electro-optical displays are nematic type liquid crystals whose polarity can be controlled by means of the location and type of chemical groups that are attached to the organic crystalline structure. By controlling polarity, nematic liquid crystalline materials have developed into those having positive dielectric anistrophy and those having negative dielectric anistrophy. Those having positive dielectric anistrophy tend to align parallel to the direction of an electric field and those having negative dielectric anistrophy tend to align at 90° to the direction of an electric field imposed across the material Although nematic liquid crystalline materials having positive dielectric anistrophy are most popular today for use in electro-optical displays, the invention contemplates electro-optical displays using any suitable electro-optical material or mixtures of such materials with or without additional materials such as dichroic organic dyes, colorants and homologous non-liquid crystalline materials and the like.

The electrically conductive coatings on the side of the plates facing the electro-optical material may be electrically energized by imposing either a direct current or alternating current voltage between the coatings. Commonly, the voltage is of a positive polarity derived by trimming the negative polarity from an alternating current source such that a pulsed current of positive polarity is provided. For electro-optical displays utilizing twisted nematic liquid crystals, the voltage is commonly from about 3 to about 10 volts.

Although the voltage may be imposed across the electro-optical material by attaching one of the conductive coatings to the ground side of the voltage source and the other conductive coating to the active side of the voltage source, it is preferred to attach only the active side of the voltage source to a particular separate conductive lead of one of the coatings of negligble resistance for transmission of the current to an electrical connecting member of controlled conductivity that extends between and electrically connects the conductive lead to a conductive lead of the conductive coating on the other plate. Although the electrical connecting member may have any suitable shape, it preferably has a cylindrical shape having its opposite ends abutting respectively against the conductive coating leads on the opposed spaced-apart plates of the display. The conductive connecting member typically has an electrical resistance controlled from about 1 ohm to about 10 ohms and is preferably isolated from the electro-optical material in order to prevent any adverse effect of one upon the other. Typically, the conductive connecting member extends between the plates either outside of the cavity or through the seal enclosing the electro-optical material as a means of insuring isolation between the conductive connecting member and the electro-optical material.

An example of an electro-optical display utilziling an electrically conductive epoxy material as a conductive connector between the facing conductive coatings of the spaced apart plates of the display is disclosed in U.S. Pat. No. 3,881,809. The connector extends through the gasket enclosing the liquid crystalline material of the display and electrically connects the conductive coating on one of the plates to the conductive coating on the other plate of the display.

Commonly, the highly conductive connecting member is provided by blending high amounts of a highly electrically conductive material such as silver into suitable non-electrically conductive resins such as the epoxy resins disclosed in U.S. Pat. No. 3,881,809. An example of the use of a solderable metal coating in a hole in the plates, of a liquid crystal cell for providing an electrical bridge between the plates is disclosed in U.S. Pat. No. 4,106,860.

It has been found, however, that electro-optical displays using conductive connecting members of the above type are not entirely satisfactory in that they are not able to maintain continuous electrical contact between the conductive leads on the plates of the display when the display is subjected to temperature cycling due generally to either the inability of the connecting member material to withstand the stress arising from the changes in temperature or the inabiliy of the connecting member material to maintain a bond to the conductive coating on both of the plates over the range of temperature cycling.

In view of the above and in order to provide electro-optical displays that are operable over a broad temperature range, a need exists to provide a material suitable for use as an electrically conductive connecting member for providing an electrical bridge between the respective conductive coating leads disposed on the plates of the display that has sufficient resiliency and is able to bond to and to maintain the bond to the respective plates and conductive coatings over a broad temperature cycling range. Likewise, it is also of advantage to use such material at other locations associated with electro-optical displays where the maintenance of electrical continuity over a broad temperature cycling range is desirable.

SUMMARY OF THE INVENTION

Accordingly, it is an object of this invention to provide electro-optical displays of the type utilizing an electrical conductive connecting member between conductive coatings on the plates of the displays that are operable over a broad temperature cycling range.

It is another object of this invention to provide an improved material for use as a highly electrically conductive connecting member between the conductive coatings on plates of electro-optical displays of the type utilizing such connecting members that is able to bond to and maintain the bond to either or both the respective conductive coating and the plates over a broad temperature cycling range.

It is further object of this invention to provide an improved, highly electrically conductive, material for use in electrical optical displays wherever the maintenance of electrical continuity is desired over a broad temperature cycling range.

DESCRIPTION OF THE DRAWINGS

FIG. 1 shows an exploded perspective view of an embodiment of the invention in which the improved electrically conductive material is used as a connecting electrical member between the conductive coatings on the plates of the electro-optical display; and FIG. 2 shows an embodiment of the invention along viewing line 2—2 shown in FIG. 1 in which the improved electrically conductive material is used to enhance the electrical connection between the conductive coating on one of the plates with the addition of a pin for connecting the plate to a source of electrical power.

DESCRIPTION OF THE PREFERRED EMBODIMENT

FIG. 1 shows an embodiment of electro-optical display 18 of the invention in an exploded perspective view prior to the assembly for convenience in referring to its parts. Display 18 comprises a pair of spaced-apart plates 1 and 2 of which at least one plate is made from a transparent material such as glass. In "transmissive" type displays, both plates 1 and 2 are transparent in order to permit light to pass completely through with plates of the display. In "reflective" type displays, only the plate through which light enters the display is transparent with the other plate being either transparent with a reflective coating or in the form of a reflector itself which reflects light back through the display which has entered the display through the other plate.

Plates 1 and 2 have respective transparent electrically conductive coatings 5B and 5A on their facing surfaces. Coatings 5A and 5B are typically formed from indium or tin oxide which is deposited as a coating on the plates with portions etched away to provide the desired configurations on each plate commonly by a silk screening—etching process familiar to those skilled in the art. In display 18, coating 5B is in the form of a rectangular coating that is broader in area than the area occupied by the separate conductive strips of coating 5A on plate 2 shown in FIG. 1.

Hermetic seal 3 is disposed between plates 1 and 2. Seal 3 is preferably made from an electricaly insulative material that will not contaminate the electro-optical material and is able to bond plate 1 to plate 2 when they are pressed together during the process of making display 18. Seal 3 is designed to enclose cavity 4 between plates 1 and 2 when plates 1 and 2 are pressed together. The electro-optical material previously described is disposed within cavity 4 by any suitable method during the process of making display 18. Seal 3 has a thickness typically in the order of from about 8 microns to about 15 microns and is uniform in thickness so that plates 1 and 2 are substantially parallel when pressed together. Seal 3 may be made from a material that undergoes a cure by baking during the process of making display 18 as is well known to those skilled in the art.

Display 18 may further include a single polarizer such as polarizer 10 or crossed polarizers such as polarizer 10 and 11 where appropriate for a partcular design. Display 18 may also include a light emitting diode such as light bulb 12 where such is desired to add illumination to enhance the image to a viewer of the display.

Coating strips 5A extend from cavity 4 past seal 3 in the form of separate leads that are supported by plate 2 as shown in FIG. 1. The separate leads of coating 5A provide a way of connecting coating strips 5A to a source of electrical power by the use of electrical connecting pins such as hereinafter described with respect to FIG. 2. Understandably displays made in accordance with the invention feature at least one electrical lead connecting the conductive coating on one of the plates within cavity 4 to a source of electrical power.

Electrical lead 6 extends away from the edge of plate 2 partially past seal 3. Lead 6 like leads 5A is made from a conductive material such as indium oxide or tin oxide. Lead 6 is the lead through which electrical current is transferred from plate 2 to plate 1. It is to be noted that lead 6 could extend into cavity 4 to become part of the configuration of coating 5A within cavity 4 where such is desired.

Electrical connecting member 7 extends between coatings 5A and 5B through seal 3 and provides an electrical interconnection therebetween when plates 1 and 2 are pressed together during the process of making display 18. Although it is preferred that member 7 extend between plates 1 and 2 through seal 3, member 7 may extend between plates 1 and 2 outside of seal 3 where such is desired.

Connecting member 7 is made from a material that is highly electrically conductive and able to bond to coatings 5A and 5B. Member 7 is preferably also able to bond to plates 1 and 2 in the region of its contact with coatings 5A and 5B in order to ensure an electrical contact therebetween. Member 7 provides an electrical interconnection between lead 6 and coating 5B when plates 1 and 2 are pressed together such that it is able to transfer an electrical current to plate 1. The voltage imposed on coating 5B differs from the voltage on coating 5A by the amount of resistance associated with member 7 such that a voltage gradient is imposed across the electro-optical material contained within cavity 4 which, when pulsed between the "on" and "off" condition, is able to rotate the molecular structure of the electro-optical material to provide an image to a viewer of the display as previously described.

Although member 7 may have any cross-sectional shape that is able to suitably conduct electrical current between coatings 5A and 5B, member 7 preferably has a substantially circular cross-sectional shape such that it is in the form of a cylinder passing through seal 3. An example of typical optical display utilizing a cylindrically shaped member 7 is where the diameter of member 7 is about 0.025 inch and the length of member 7, which is the same as the thickness of seal 3, is about 10 microns. In display 18 member 7 is disposed in an opening provided through seal 3 before plates 1 and 2 are pressed together. Member 7 may be disposed between plates 1 and 2 by the silk screening process where such is desired.

Understandably display 18 will undergo some dimensional change when subject to temperature cycling as previously described, it is extremely important that member 7 maintain continuous electrical contact between coatings 5A and 5B during such periods of thermal cycling. In order for member 7 to maintain continuous electrical contact between coatings 5A and 5B, it must remain bonded to coatings 5A and 5B possess sufficient resiliency to withstand any stresses imposed upon it during such periods through cycling.

Member 7 has heretofor commonly been made by blending an amount of conductive particles into a suitable epoxy resin sufficient to impart the amount of electrical resistance desired. Although tin, nickle, silver, conductive carbon black or other highly conductive material may be used for the electrically conductive particles, it is preferred to use silver. Typically, the conductive particles comprise from about 50% to about 95% and more commonly from about 75% to about 95% of the weight of the epoxy-resin to provide a resistance for the particular configuration of member 7 that is from about 1 ohm to about 10 ohms. Other resins found suitable for use in making member 7 are the thermoplastic phenoxy resins disclosed in U.S. Pat. No. 3,994,568, the disclosure of which is incorporated herein by reference. Such phenoxy resins may also include one or more epoxy resins where such is desired.

It has been discovered however that such epoxy and phenoxy resins and blends thereof have not been able to maintain a continuous electrical connection between plates of an electro-optical display when the display is subjected to temperature cycling in the range if from about $-30°$ C. to about $80°$ C. The desireability that electro-optical displays be operable over such temperature ranges readily be appreciated for enabling broad applications of such displays.

It has been discovered that the defect in the use of epoxy or phenoxy or epoxy-phenoxy resins in member 7 can be overcome by incorporating an effective amount of an organic glycol into the subject resin-conductive particle blend. More particularly, it has been discovered that a phenoxy-epoxy resin blend containing from about 50% to about 95% by weight, and preferably from about 75% to about 95% by weight of conductive particles to the total weight of the phenoxy or epoxy or phenoxy-epoxy resin blend plus an effective amount of an organic glycol possesses good flexibility and has the ability to remain bonded to the conductive coatings on the plates of the display when the display is subjected to temperature cycling from about $-30°$ C. to about $80°$ C.

A suitable phenoxy resin for use in making member 7 is sold under grade type PKHJ by Union Carbide Corporation. Although other epoxy resins may be suitable, it has been found that epoxy resins sold under the Trademarks "EPON" 1001F and "EPON" 1009 are particularly suitable for making member 7.

Although a suitable epoxy or phenoxy resin may be used alone, it is preferred to add one or more epoxy resins to the phenoxy resin such that the epoxy resin comprises from about 1% to about 75% by weight to the total weight of the phenoxy-epoxy resin blend. A preferred blend in where the epoxy resin comprises about 20% to about 50% by weight of the total weight of the phenoxy-epoxy resin blend. Although other materials may be added to the material for making member 7 provided they do not interfer with the electrical conductivity desired or the ability of member 7 to maintain a bond to the conductive coatings when exposed to temperature cycling from about $-30°$ C. to about $80°$ C., the material preferably comprises a blend of phenoxy resin, preferably including at least one epoxy resin, a suitable amount of electrically conductive particles such as silver, and an effective amount of an organic glycol.

An organic glycol found particularly suitable for enabling member 7 to maintain continuous electrical contact between the conductive coatings on the plates of an electrical display during temperature cycling from about $-30°$ C. to about $80°$ C. is a triple ester glycol such as triacetin. Triacetin is available from numerous chemical supply houses. The term "an effective amount" of the organic glycol as used herein means an amount sufficient to ensure that the phenoxy or epoxy or phenoxy-epoxy resin and conductive particle blend will have suffficient flexibility and ability to maintain the bonded electrical interconnection between the conductive coatings on the plates of the electro-optical display when the display is subjected to temperature cycling from about $30°$ C. to about $80°$ C. Typically, the organic glycol comprises about 10% to about 40% by weight to the weight of the epoxy, thermoplastic phenoxy or phenoxy-epoxy resin blend used in the material for making member 7. An example of a material found particularly suitable is where 76 grams of a phenoxy-epoxy resin blend comprising approximately 60% by weight of Epon 1001F and 40% by weight of Union Carbide phenoxy resin PKHJ is blended with about 23 grams of triacetin to which total weight of 100 grams is added about 90 grams of silver. The material was found to have a viscosity such that it could be easily deposited in the opening through the seal, exhibited attractive physical and electrical properties after air drying, and retained good flexibility and the desired electrical resistance and the ability to maintain a continuous electrical contact between the conductive coatings on the plates during temperature cycling from about −30° C. to about 80° C. after the plates of the electro-optical display were pressed together and the seal between the plates were cured for about 10 minutes at about 105° C. to about 120° C.

The material for making member 7 may also include an effective amount of at least one solvent when such is desired to provide the viscosity desired for pouring or silk screening member 7 through an opening in seal 3 or outside of seal 3 as previously described. A solvent found particularly suitable for use in selecting Union Carbide PKJH phenoxy resin and Epon 1001F epoxy resin is diethylene either diethyl glycol. Diethylene glycol diethyl ether has been found to be compatible with the phenoxy and epoxy resins and triacetin and exhibits an evaporation rate sufficient to enable commercial production of electro-optical displays at an attractive rate. An effective amount of diethylene glycol diethyl ether for use in solvating Union Carbide PKJH phenoxy resin and Epon 1001F epoxy resin has been found to be from about 40% to about 70% by weight of the solvent to the weight of the phenoxy resin or phenoxy-epoxy resin mixture.

In cases where the epoxy resin is a liquid at ambient temperature, the epoxy resin may itself act as solvating agent for the thermoplastic phenoxy resin and thus preclude the addition of one or more solvents as a means of eliminating the necessity of heating phenoxy resin or epoxy resins that are solids at ambient temperature above their respective softening points in order to facilitate production of electro-optical displays using the material of the invention.

FIG. 2 shows an example of another use in electro-optical displays of the highly conductive material used to make member 7 of the display of FIG. 1. In FIG. 2, plate 2, conductive coating 5A, and seal 3 are the same as previously described for FIG. 1. Coating 5A extends past seal 3 from coating 4, not referenced, towards the edge of plate 2 in the form of a lead and is supported by plate 2 as previously described. Electrical connecting pin 13 is connected to electrical conductor 15 which is encased by electrical insulation 14. Pin 13 is "U" shaped such that it is able to be pressed against the edges of plate 2 and enclose both surfaces of plate 2 as well as the particular coating 5A lead shown to connect the 5A coating lead to a source of electrical power. An electrical connecting pin such as pin 13 may also be used to connect lead 6, previously described for FIG. 1, to a source of electrical power. Pin 13 is dimensionally adapted so that a suitable amount of the highly conductive material used to make member 7 can be deposited on the coating 5A lead before pin 13 is squeezed together to secure it to plate 2 and the coating 5A lead. In FIG. 2 the highly conductive material is shown in the form of a spherical dot 16 which is able to flatten when pin 13 is secured to plate 2 and the coating 5A lead. Since most electro-optical displays have a plurality of leads on one of the plates which require separate connection to a source of electrical power, automatic dot producing devices can be employed to rapidly deposit each dot 16 onto respective coating leads before each electrical connecting pin is secured to the plate to which the leads are adhered.

It has been found that the depositing of the highly conductive material hereinbefore described between the conductive coating leads and the respective pins greatly enhances the electrical contacting relationship between the two and, as in the case of member 7 of FIG. 1, ensures a continuous electrical contacting relationship when the display is subjected to temperature cycling from about −30° C. to about 80° C. The region of the securement between pin 13 and plate 2 and the respective coating 5A leads may be additionally enclosed by a suitable protective encapsulating compound where such is desired.

What is claimed is:

1. An improved electrically conductive material for use in providing electrical interconnections in an electro-optical display, comprising:

said material characterized as being resilient and having the ability to maintain a continuous electrical contacting relationship while the display is subjected to temperature cycling of from about −30° C. to about 80° C. as a result of said material comprising a resilient blend of a resin selected from the group consisting of epoxy and thermoplastic phenoxy resins and mixtures thereof with an amount of electrically conductive particles sufficient to impart said electrical interconnections with a resistance of from about 1 ohm to about 20 ohms and consisting essentially of from about 10 percent to about 40 percent by weight based upon the total weight of said glycol and said resin of an organic glycol so that said material maintains continuous flexible and electrical contact during the temperature cycling.

2. The material of claim 1, wherein the glycol is a triple ester glycol and wherein the amount of said conductive particles is from about 50 percent to about 95 percent by weight based upon the weight of said conductive particles and said resin.

3. The material of claim 2, wherein the triple ester glycol is triacetin.

4. The material of claim 2, wherein the conductive particles are selected form the group consisting of silver, tin, nickle and carbon black particles and mixtures thereof.

5. The material of claim 2, wherein the resin comprises a blend of from about 1% to about 75% by weight of the epoxy resin to the weight total of the phenoxy epoxy resin.

6. The material of claim 2, including at least one solvent that is compatible with the organic glycol, with the phenoxy resin and the epoxy resin, and the mixtures thereof.

7. The material of claim 6, wherein the solvent is diethylene ether diethyl glycol.

8. The material of claim 7, wherein the diethylene ether diethyl glycol comprises from about 40% to about 70% by weight of the weight of said phenoxy resin or the epoxy resin and the mixtures thereof.

9. An improved electro-optical display of the type including a pair of spaced-apart plates of at which at least one plate is transparent, an electro-optical material enclosed by a hermetic seal within a cavity between the plates, an electrically conductive coating configuration disposed on the side of each of the plates facing towards the electro-optical material and an electrical contact therewith and having at least one electrical lead extending from the cavity past the seal on one of the plates for connecting said electrical connecting member electrically isolated from the electro-optical material and electrically interconnecting the conductive coatings on each of the plates, said electrical connecting member characterized by having the ability to bond to each of said conductive coatings and being resilient and having the ability to maintain a continuous electrical interconnection between the coatings while the display is subjected to temperature cycling of from about −30° C. to about 80° C. as a result of the connecting member having been made from a material comprising a resilient blend of a resin selected from the group consisting of epoxy and thermoplastic phenoxy resins and mixtures thereof with an amount of electrically conductive particles sufficient to provide the connecting member with an electrical resistance between the coatings of from about 1 ohm to about 10 ohms and consisting essentially of from about 10 percent to about 40 percent by weight based upon the total weight of said glycol and said resin of an organic glycol so that said connecting member maintains continuous flexible and electrical contact with both of said conductive coatings during the temperature cycling.

10. The display of claim 9, wherein the glycol is a triple ester glycol.

11. The display of claim 10, wherein the triple ester glycol is triacetin and wherein the amount of said conductive particles is from about 50 percent to about 95 percent by weight based upon the weight of said conductive particles and said resin.

12. The display of claim 10, wherein the conductive particles are selected from the group consisting of silver, tin, nickle and carbon black particles and mixtures thereof.

13. The display of claim 10, wherein the resin comprises a blend of from about 1% to about 75% by weight of the epoxy resin to the total weight of the phenoxy epoxy resin.

14. The display of claim 10, wherein the conductive particles comprise from about 50% to about 95% by weight of the weight of the resin.

15. The display of claim 10, wherein the material includes at least one solvent that is compatible with the organic glycol and the phenoxy resin and the epoxy resin and the mixtures thereof.

16. The display of claim 15, wherein the solvent is diethylene ether diethyl glycol.

17. The display of claim 15, wherein the diethylene ether diethyl ether comprises from about 40% to about 70% by weight of the phenoxy resin and the epoxy resin and the mixtures thereof.

* * * * *